Figure 1:
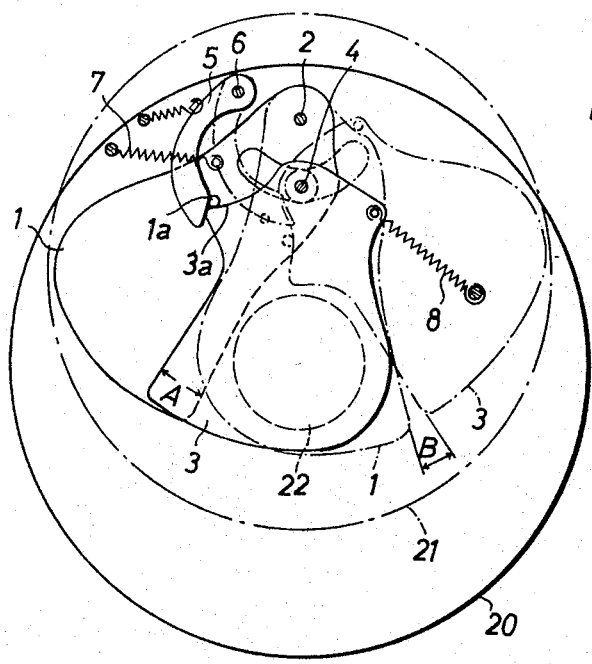

INVENTOR.
GERD KIPER
GÜNTER FAUTH

United States Patent Office 3,334,563
Patented Aug. 8, 1967

3,334,563
BETWEEN-THE-LENS SHUTTERS
Gerd Kiper and Günter Fauth, Unterhaching, near Munich, Germany, assignors to Agfa Aktiengesellschaft, Leverkusen, Germany
Filed Aug. 12, 1964, Ser. No. 389,113
Claims priority, application Germany, Aug. 24, 1963, A 43,891
12 Claims. (Cl. 95—60)

The present invention relates to photographic shutters.

More particularly, the present invention relates to between-the-lens shutters of the type which include a pair of shutter blades which move in the same direction but at different times so as to make an exposure.

Shutters of this general construction are well known and take a wide variety of forms. However, they have the disadvantage of requiring a very large amount of space in the cocked as well as in the run-down positions of the shutter, so that the diameter of the shutter housing must be much greater than iris shutters, for example, in order to provide openings of the same size as a corresponding iris shutter. However, in spite of the relatively large size of the housing which is required, the two-blade type of shutter is of considerable advantage because it is so simple and inexpensive to manufacture.

It is accordingly a primary object of the present invention to provide a two-blade type of between-the-lens shutter, of the general type referred to above, which, however, in accordance with the invention, avoids the disadvantage of requiring an extremely large space in order to accommodate the shutter.

In particular, it is an object of the present invention to provide a structure which will automatically change the relationship between the blades during their movement so as to achieve in this way a considerable reduction in the overall dimensions of the shutter assembly of the invention.

Furthermore, it is an object of the invention to achieve a reduction in the size of the shutter assembly through a particular positioning of the turning axes of the shutter blades.

In addition, it is an object of the present invention to provide an exceedingly simple structure for displacing the blades from their run-down to their cocked positions.

In general, it is an object of the present invention to provide for a shutter assembly of the above type a blade structure which in itself requires an extremely small amount of space and which in addition is controlled by a structure which displaces the blades through relatively small distances so as to maintain the dimensions of the shutter assembly at a minimum.

In addition, it is an object of the present invention to achieve a compactness far greater than that which has been heretofore attainable by arranging the exposure aperture of the shutter in a particular manner with respect to the shutter housing.

With these objects in view, the invention includes, in a between-the-lens shutter assembly which has an exposure aperture, leading and trailing shutter blades and support means supporting the blades for turning movement between run-down and cocked positions, the leading blade turning in advance of the trailing blade from the cocked to the run-down position so as to uncover the aperture and the trailing blade then turning from its cocked to its run-down position so as to close the aperture and thus terminate the exposure. With the structure of the invention there is provided a moving means which is operatively connected to the blades for displacing the latter from their rundown to their cocked positions, and this moving or cocking means of the invention alters the extent to which the blades overlap each other during their movement from their run-down to their cocked positions.

Figure 2:
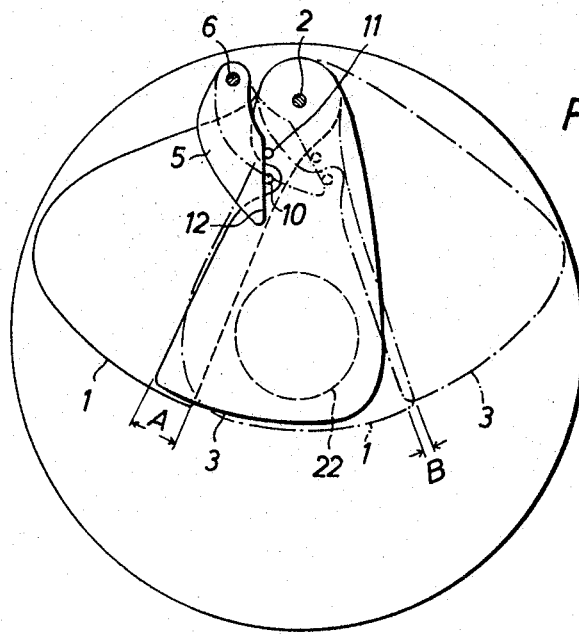

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly diagrammatic illustration of one possible embodiment of a structure according to the invention, the shutter blades of FIG. 1 being shown in solid lines in their run-down positions and in dot-dash lines in their cocked positions; and FIG. 2 is a partly diagrammatic illustration of a second possible structure according to the invention, FIG. 2 also illustrating the shutter blades in solid lines in their run-down positions and in dot-dash lines in their cocked positions.

In both of the figures similar parts are designated by the same reference characters.

Referring to FIG. 1, there is diagrammatically indicated a shutter housing 20 which serves to house the leading shutter blade 1 and the trailing shutter blade 3. A support means is provided to support these blades for turning movement between their run-down and cocked positions, and the support means includes a stationary pivot pin 2 which supports the blade 1 for turning movement about an axis parallel to the optical axis and a pivot pin 4 which also extends parallel to the optical axis and which supports the trailing blade 3 for turning movement between its run-down and cocked positions.

The shutter assembly includes an exposure aperture 22 which, when it is uncovered, will serve to expose film, and it will be seen that in the run-down positions of the blades 1 and 3, shown in solid lines in FIG. 1, the aperture 22 is primarily covered by the trailing blade 3, while in the cocked positions of the blades, shown in dot-dash lines in FIG. 1, the aperture 22 is closed primarily by the leading blade 1. When the blades are in their cocked positions and an exposure is to be made, the leading blade 1 immediately returns from its cocked to its run-down position while the trailing blade 3 remains in its cocked position, so that in this way the aperture 22 is uncovered, and then the blade 3 returns from its cocked to its run-down position so that the exposure is terminated in this way.

A cocking means is provided for displacing the blades from their run-down to their cocked positions, and this cocking means takes the form of a cocking member 5 in the form of a lever turnable about a stationary pivot 6. The lever 5 is adapted to be manually turned when it is desired to cock the shutter, and when the lever 5 is turned in a counterclockwise direction from its solid-line position shown in FIG. 1, an end edge of the lever 5 engages a projection of the blade 1, this projection being in the form of a pin 1a which is fixedly carried by the blade 1, so that the counterclockwise turning of the lever 5, as viewed in FIG. 1, will result in counterclockwise turning of the blade 1 from its run-down to its cocked position, and it is to be noted that this turning takes place in opposition to a spring 7 which is tensioned so as to urge the blade 1 to return to its run-down position. An additional spring acts on the cocking lever 5 to return the latter also to its rest position shown in solid lines in FIG. 1.

With the embodiment of FIG. 1 the cocking means includes a motion-transmitting structure for transmitting the turning of the blade 1 to the blade 3, and this motion-transmitting structure includes a camming edge 3a which forms an integral part of the blade 3 and which is engaged by the pin 1a, so that when the latter pin turns with the blade 1 in a counterclockwise direction in response to turning of the lever 5 for cocking the shutter, the pin 1a engages the camming edge 3a and displaces the blade 3 also from its run-down to its cocked position, and in this way both of the blades simultaneously are displaced from their run-down to their cocked positions. A spring 8 is operatively connected with the trailing blade 3 for urging the latter to its run-down position, and thus during cocking of the shutter the spring 8 is tensioned so as to urge the blade 3 from its cocked to its rundown position when the blade 3 has been cocked.

As is apparent from FIG. 1, with the above-described structure the blades 1 and 3 while they turn simultaneously during cocking of the shutter do not turn through precisely the same angles. The angular relationship between these blades is altered during cocking of the shutter.

As is apparent from FIG. 1 in the run-down positions of the blades when the aperture 22 is primarily covered by the trailing blade 3, the right side edge portion of the blade 1 is located beyond but closely adjacent to the aperture 22, while in the cocked position of the blades the left side edge portion of the trailing blade 3 is located just beyond but closely adjacent to the exposure aperture 22. Therefore, when the shutter is tripped so as to make an exposure and thus release the leading blade 1 for return to its run-down position, the aperture 22 will be uncovered so as to make an exposure, and when the blade 3 returns to its run-down position so as to terminate the exposure, this left side edge portion of the blade 3 will overlap the right side edge portion of the blade 1 to the extent A which is indicated in FIG. 1. On the other hand, during cocking of the shutter the blades turn with respect to each other, as a result of the action of the cocking means thereon, in such a way that in the cocked positions there is the distance B indicated in FIG. 1 between the joining edge portions of the blades, and thus the extent to which the blades overlap is not only altered by the cocking means during cocking of the shutter but in addition the extent of overlap of the blades is considerably reduced during cocking of the shutter, as is apparent from the overlapping extents A and B indicated in FIG. 1. The structure for retarding the blade 3 so as to provide a predetermined exposure time has not been illustrated since it forms no part of the present invention and for the sake of clarity has not been indicated.

It is apparent, therefore, that if the overlapping relationship B were maintained at all times between the blades then in the run-down positions thereof more space would be required for the blades, whereas the feature of providing in the run-down positions of the blades a greater overlap than in their cocked positions reduces the dimensions required for the shutter housing 20. Furthermore, there is a saving of space achieved by providing the trailing blade 3 with the turning axis 4 which is situated closer to the aperture 22 than the turning axis of the blade 1 which is provided by the pivot pin 2.

It is to be noted that the blade 1 is formed with an arcuate slot so that it will clear the pivot pin 4 and also the various springs are mounted in such a way that they do not interfere with the movement of the blades. Thus, for example, it will be noted that the spring 8 is hooked at one end onto a pin carried by the blade 3 while the other end of the spring 8 which is distant from the blade 3 is fixed to a pin which is shown in section in FIG. 1, and this latter pin is carried by a wall in front of the plane in FIG. 1, which is to say between the plane of FIG. 1 and the viewer of FIG. 1, so that in this way the spring 8 does not interfere with the movement of the parts, and in the same way the other springs are mounted so that all of the parts can freely turn between the positions shown in FIG. 1 and described above.

According to the embodiment of the invention which is illustrated in FIG. 2, the leading blade 1 and the trailing blade 3 are supported in the shutter housing 20 for turning movement by a support means which includes the pivot pin 2 which extends through both of the blades so that in this embodiment the blades have a common turning axis determined by the axis of the pin 2 which extends parallel to the optical axis.

The cocking means of this embodiment includes also a cocking lever 5 which is turnable about a pivot 6, but in this case the blades 1 and 3 respectively fixedly carry projections in the form of pins 10 and 11 which are directly engaged by a camming edge of the cocking lever 5, so that while the latter directly turns both of the blades by engaging the projections 10 and 11 thereof, nevertheless as a result of the configuration and inclination of the camming edge 12 of lever 5 the results of the invention are achieved. Thus, it will be seen that in FIG. 2 also the extent of overlap A of the blades in their run-down positions, shown in solid lines in FIG. 2, is considerably greater than the extent of overlap B of the blades in their cocked positions, shown in dot-dash lines in FIG. 2. The various springs of the embodiment of FIG. 2 are omitted but have the same structure and connection to the parts as shown in FIG. 1. Thus, in FIG. 2 also it will be seen that in the run-down position the trailing blade 3 primarily covers the aperture 2 while in the cocked position the leading blade 1 primarily covers the aperture 22, and in the run-down position the right side edge of the blade 1 is located closely adjacent to but beyond the aperture 22 while in the cocked position the left side edge of the blade 3 is located closely adjacent to but beyond the aperture 22, and it is these side edges of the blades which overlap each other to the extent A which is considerably greater than the extent B in the cocked positions of the blades. The inclination of the camming edge 12 of the lever 5 is such that during cocking of the shutter the blades turn with respect to each other in a manner diminishing the extent of overlap of the blades.

Of course, the invention is not necessarily limited to the above-described details. Thus, it is possible to provide a covering blade, preferably controlled by the turning movement of the trailing blade 3, so that when the blades 1 and 3 overlap each other to a small extent or cover the aperture 22 to a relatively small extent light-tightness will be sufficiently assured by such a covering blade. Moreover, it is possible to further reduce the size of the shutter housing by providing the blades 1 and 3 under certain conditions with different configurations, although it is also possible to provide the blades with the same configurations.

In addition, it is possible to make the shutter housing 20 still smaller by arranging the opening 22 eccentrically with respect to the center of the housing, and in FIG. 1 a shutter housing 21 is indicated in dot-dash lines positioned in such a way that the aperture 22 is displaced from the center of the housing 21, and thus it will be seen that with such an arrangement the diameter of the housing 21 will be considerably less than the diameter of the housing 20.

It will be understood that each of the elements described above, or two or more together, may also find a useful application in other types of shutters differing from the types described above.

While the invention has been illustrated and described as embodied in between-the-lens shutters, it is not intended to be limited to the details shown, since various modifications and structural changes may be made without deparing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a between-the-lens shutter assembly which includes an exposure aperture, in combination, leading and trailing shutter blades; support means supporting said blades for turning movement between a run-down position in which said blades overlap each other to a predetermined extent and a cocked position in which said blades overlap each other to a smaller extent than said predetermined extent, said leading blade being located entirely on one side of said exposure aperture and said trailing blade entirely covering said exposure aperture when said blades are in said run-down position and said trailing blade being located entirely on the other side of said exposure aperture and said leading blade entirely covering said exposure aperture when said blades are in said cocked position thereof, said leading blade turning in advance of said trailing blade from the cocked to the run-down position of said leading blade to uncover said exposure aperture in order to make an exposure and said trailing blade turning from its cocked to its run-down position subsequent to the turning of said leading blade from its cocked to its run-down position in order to terminate the exposure; and means operatively connected to said blades for turning the latter from their run-down position in which said blades overlap each other to said predetermined extent to their cocked position in which said blades overlap each other to said smaller extent.

2. In a between-the-lens shutter assembly which has an exposure aperture, in combination, leading and trailing shutter blades; support means supporting said blades for turning movement respectively about different axes between a run-down position in which said blades overlap each other to a predetermined extent and a cocked position in which said blades overlap each other to a smaller extent than said predetermined extent, said leading blade being located entirely on one side of said exposure aperture and said trailing blade entirely covering said exposure aperture when said blades are in said run-down position and said trailing blade being located entirely on the other side of said exposure aperture and said leading blade entirely covering said exposure aperture when said blades are in said cocked position thereof, said leading blade having in said run-down position a trailing edge portion located beyond but closely adjacent to said aperture at said one side thereof and said trailing blade having in said cocked position a leading edge portion located beyond but closely adjacent to said aperture at said other side thereof, said trailing blade turning subsequent to said leading blade from the cocked to the run-down position so that said leading blade will uncover said exposure aperture to make an exposure for a time which continues until said aperture is covered by turning of said trailing blade back to its run-down position; and cocking means operatively connected to said blades for displacing the latter from their run-down position in which said blades overlap each other to said predetermined extent to their cocked position in which said blades overlap each other to said smaller extent.

3. In an assembly as recited in claim 2, one of said blades having a turning axis situated closer to said aperture than the turning axis of the other of said blades.

4. In a between-the-lens shutter assembly which has an exposure aperture, in combination, leading and trailing shutter blades; support means supporting said blades for turning movement between a run-down position in which said blades overlap each other to a predetermined extent and a cocked position, in which said blades overlap each other to a smaller extent than said predetermined extent, said leading blade being located entirely on one side of said exposure aperture and said trailing blade entirely covering said exposure aperture when said blades are in said run-down position and said trailing blade being located entirely on the other side of said exposure aperture and said leading blade entirely covering said exposure aperture when said blades are in said cocked position thereof, said leading blade having in said run-down position a trailing edge portion located beyond but closely adjacent to said aperture at said one side thereof and said trailing blade having in said cocked position a leading edge portion located beyond but closely adjacent to said aperture at said other side thereof, said leading blade turning in advance of said trailing blade from the cocked to the run-down position so as to uncover said aperture and said trailing blade then turning from its cocked to its run-down position to cover said aperture and terminate an exposure; and cocking means operatively connected with said blades for displacing the latter from their run-down position in which said blades overlap each other to said predetermined extent to their cocked position in which said blades overlap each other to said smaller extent, said cocking means including a projection on one blade and a cocking member movably carried by said support means and engaging said projection to displace said one blade from its run-down to its cocked position, and a motion-transmitting structure transmitting turning of said one blade to the other of said blades so as to displace the latter also from its run-down to its cocked position.

5. In a shutter assembly as recited in claim 4, said motion-transmitting structure including said projection of said one blade and a camming edge of said other blade engaged by said projection so that the latter transmits turning of said one blade to said other blade by engaging said camming edge thereof.

6. In a between-the-lens shutter assembly which has an exposure aperture, in combination, leading and trailing shutter blades; support means supporting said blades for turning movement about a common axis between a run-down position in which said blades overlap each other to a predetermined extent and a cocked position in which said blades overlap each other to a smaller extent than said predetermined extent, said leading blade being located entirely on one side of said exposure aperture and said trailing blade entirely covering said exposure aperture when said blades are in said run-down position and said trailing blade being located entirely on the other side of said exposure aperture and said leading blade entirely covering said exposure aperture when said blades are in said cocked position thereof, said leading blade turning from its cocked to its run-down position in advance of said trailing blade so as to uncover said aperture and said trailing blade when turning from its cocked to its run-down position covering said aperture to terminate an exposure; and cocking means operatively connected to said blades for displacing the latter from their run-down to their cocked positions while altering the extent to which said blades overlap each other from said predetermined to said smaller extent.

7. In an assembly as recited in claim 6, said cocking means including a pair of projections respectively carried by said blades and a cocking member engaging said projections to turn said blades about said common axis.

8. In an assembly as recited in claim 7, said cocking member having a camming edge engaging said projections during displacement of said blades from their run-down to their cocked positions for altering the extent to which said blades overlap each other.

9. In an assembly as recited in claim 1, a covering blade covering said aperture when said leading and trailing blades overlap each other to a small extent.

10. In an assembly as recited in claim 9, cam means actuated by said trailing blade and displacing said covering blade during running down of said trailing blade from its cocked to its run-down position.

11. In an assembly as recited in claim 1, said assembly including a shutter housing and said exposure aperture being eccentrically positioned with respect to the outer periphery of said housing.

12. In a between-the-lens shutter assembly which has an exposure aperture, in combination, leading and trailing shutter blades and support means supporting said blades for turning movement between a run-down position in which said blades overlap each other to a predetermined extent and a cocked position in which said blades overlap each other to a smaller extent than said predetermined extent, said leading blade being located entirely on one side of said exposure aperture and said trailing blade entirely covering said exposure aperture when said blades are in said run-down position and said trailing blade being located entirely on the other side of said exposure aperture and said leading blade entirely covering said exposure aperture when said blades are in said cocked position thereof, said leading blade turning in advance of said trailing blade from the cocked to the run-down position to uncover said aperture and said trailing blade then turning from its cocked to its run-down position to cover said aperture and terminate an exposure, said leading blade in its run down position having a side edge portion located closely adjacent to but beyond said aperture at said one side thereof and said trailing blade in its cocked position having a side edge portion located beyond but closely adjacent to said aperture at said other side thereof and said side edge portions of said blades overlapping each other to said predetermined extent when said blades are in their run-down positions; and cocking means operatively connected to said blades for displacing the latter from their run-down to their cocked positions while decreasing the extent to which said side edge portions overlap each other, so that in the cocked positions of said blades said side edge portions thereof overlap each other to said smaller extent which is less than the predetermined extent to which said side edge portions overlap each other in the run-down positions of said blades.

References Cited

UNITED STATES PATENTS 2,238,491    4/1941    Hutchison _____ 95—60

JOHN M. HORAN, *Primary Examiner.*